Dec. 22, 1959        R. F. SEWIG        2,917,981
PHOTOGRAPHIC CAMERA WITH SPRING MECHANISM
Filed Oct. 7, 1954
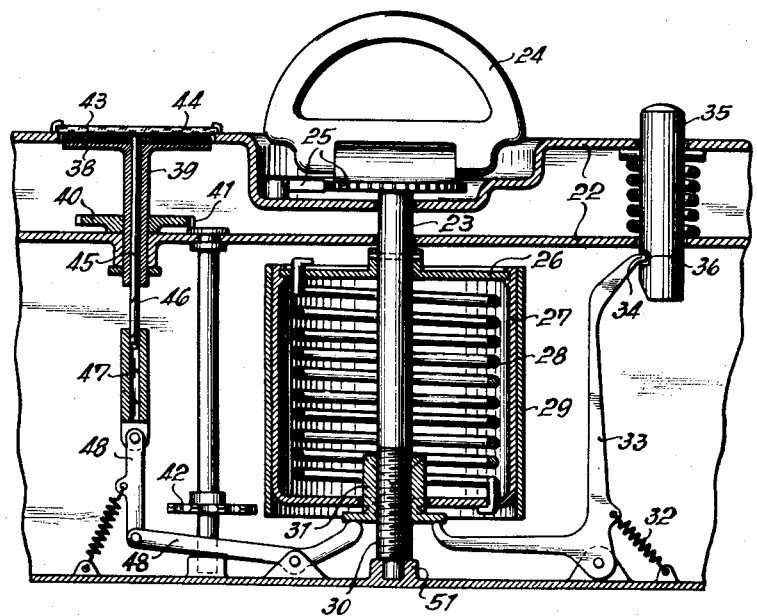
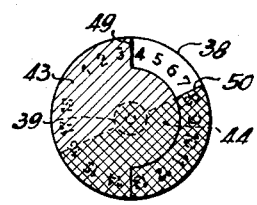
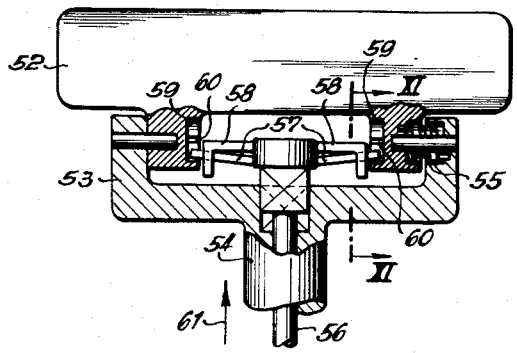
INVENTOR
RUDOLF F. SEWIG
BY *Mock & Blum*
ATTORNEYS

United States Patent Office 2,917,981
Patented Dec. 22, 1959

2,917,981

PHOTOGRAPHIC CAMERA WITH SPRING MECHANISM

Rudolf F. Sewig, Braunschweig, Germany, assignor to Voigtlander A.G., Braunschweig, Germany, a corporation of Germany Application October 7, 1954, Serial No. 460,916

Claims priority, application Germany October 7, 1953

6 Claims. (Cl. 95—11)

This invention relates to photographic cameras provided with a spring mechanism and has particular relation to cameras of this type which have means for indicating the condition of tension of the driving spring of said mechanism.

Photographic cameras and movie cameras, which are provided with a driving spring mechanism, have the disadvantage that in taking photographic pictures the condition of the driving spring cannot be observed by the operator prior to the taking of an individual picture.

It is an object of the present invention to overcome this difficulty by providing the driving spring mechanism of the photographic camera with means which cooperate with the driving spring and indicate the degree of tension of the driving spring.

According to one embodiment of the invention, indication of the degree of tension of the driving spring is effected by visual indicating devices which indicate either the extent to which the driving spring has already been relieved from tension or give indication for what, or how many, photographic pictures the tension of the driving spring is still sufficient in the respective condition of the camera.

According to another embodiment of the invention, the device can be constructed in such manner that it actuates a mark only when the tension of the spring has fallen under a predetermined lower limit, or it locks operation of the camera in this condition.

For example, according to one embodiment of this modification, the release button of the camera can be locked so that it cannot be depressed, if the tension falls under a predetermined minimum value. Thereby release of the shutter and, if desired, also other camera functions, such as for example the film advancing mechanism which may be controlled by the release knob, can be likewise locked until the spring mechanism is put again under tension by winding.

The beforementioned visual indicating means can be advantageously structurally combined with the picture-counting mechanism of the camera in such manner that indications of these two devices can be read at the same place or in mutual relation to each other. Such arrangement which consists of the picture-counting disc proper and a reading window of adjustable size, can be read particularly easily, whereby one edge of the reading window is stationary relative to the camera, while another edge of the reading window is adjusted by the device in order to indicate the condition of tension of the driving spring. In this manner information on the next picture can be read on one edge of the reading window. Simultaneously, it can be observed for what picture numbers the available tension of the driving spring is still sufficient in the respective condition of the camera.

It has been found that particularly advantageous embodiments of the invention result if a visual indicator of tension is centrally or excentrically arranged on, or in connection with, the handle for winding the spring mechanism, whereby the driving spring is arranged either in the handle member for winding the driving spring, for example in the winding button proper, or in the film winding spool. In all cases, the handle member, for example a winding button, a winding handle, or a lever, is prevented from turning in one direction, relative to the camera casing.

According to a modified construction, between the end to be wound of the driving spring and the handle member, a coupling member is inserted, which is secured from turning in one direction relative to the camera casing, while between the handle member, which is freely rotatable in both directions relative to the camera, and the coupling member, a driving member is arranged, which can act on the coupling member only in the direction of winding.

For recording the relative movement between the ends of the driving spring, various gears, for example worm gears, wheel gears and sun- and planet gears can be used. In using a winding handle member which can be sunk in the camera casing, said relative movement can be utilized also for releasing said handle member which is under spring effect and held by a bolt in sunk position, so that said member automatically springs to winding position, as soon as the tension of the spring falls under a predetermined minimum tension.

In order to simplify reading, showing of the visual mark or of the tension indicator for the spring tension, can be reproduced by optical means in the viewfinder of the camera, preferably in its picture area frame, unless said mark is arranged in the finder in such manner that its indication is seen likewise on the edge of the picture area frame of the finder.

The appended drawings illustrate by way of example and without limitation some embodiments of the invention.

Figure 1 is a diagrammatical sectional illustration of a part of a photographic camera, provided with a spring drive, a winding member, a combined picture-counting and tension indicating device and locking means for the release button of the camera, said locking means being dependent on the tension of the driving spring;

Figure 2 is a top view of the combined picture-counting and tension indicating device shown in Fig. 1;

Figure 3 is a sectional view of winding means which is under the effect of the spring mechanism and springs to winding position if the tension of the spring falls below a certain predetermined value, and Figure 4 is a view of the device shown in Fig. 3 along lines XI—XI.

Fig. 1 diagrammatically illustrates a photographic camera provided with means for indicating the number of the pictures in combination with an indication of the tension condition of the driving spring and an automatic means for locking the release button which comes into action when the tension of the spring becomes insufficient. A winding shaft 23 is arranged in the camera casing 22 and said shaft is connected with a hinged member 24 and is secured from turning in backward direction by locking means 25. Disc 26, which is firmly connected with shaft 23, forms one bearing for film winding spool 27 and one point for fastening driving spring 28. The other end of the driving spring is connected to film winding spool 27. The driving spring is wound by turning member 24. In order to simplify illustration, the members for checking and controlling running down of the film winding spool have been omitted in the drawing. In order to compensate for the differences in the lengths of films during winding-up, and in order to effect rewinding of the film, a spool sleeve 29 is provided and positively coupled with the film winding spool, by means likewise not shown in the drawing.

Winding shaft 23 is provided with a thread 30 which is in engagement with a traveling screw-nut 31 which has a prismatic design on its outer surface and cannot be turned, but is displaceably guided in a flange of winding spool 27. This arrangement is adjusted or tuned in the embodiment shown in such manner that said screw-nut is in its upper position when driving spring 28 is relieved from tension and moves downward upon increasing tension of the driving spring. One arm of an angle lever 33, which is rotatably arranged in the camera casing, bears against the lower collar or flange of movable screw-nut 31 under the effect of a tension spring 32. The other arm of angle lever 33 is designed elastically, for example by suitable dimensioning, to an extent which is equal to or larger than the contemplated depth of a nose 34 provided at its end, by means of which it lockingly engages a groove 36 provided in the release button 35, in release position of screw-nut 31 and in rest position of the release button 35 of the camera. Therefore in the release position, shown in the drawing, the release button cannot be pressed down before the spring mechanism is rewound. As the transport of the film and running-down of the spring mechanism are likewise controlled from the release button, all camera functions will be prevented until upon rewinding the driving spring, nose 34 swings again to the left.

Furthermore, in this embodiment a combined release device is provided for reading the number of the next picture to be taken and the numbers of further pictures which can be taken at a certain condition of tension of the driving spring. This device consists of a counting disc 38, carrying the conventional numbers. Said disc 38 is carried by a hollow shaft 39 and is advanced by one division, over a cog wheel 40 and a crank pin 41, upon each revolution of a counting wheel 42, which engages perforations of the film. Thereby, the periphery of counting wheel 42 corresponds to the length of a picture. The counting disc is rotatably arranged under a glass plate 43, which is stationary relative to the camera and said plate is blackened to such extent that at least one half of the scale on disc 38 is covered or masked. Furthermore, a sector disc 44 of at least 180° is rotatably arranged on hollow shaft 39, between glass plate 43 and film-counting disc 38. Shaft 45 has on its lower end a steep thread 46, by which it is in engagement with a non-rotatable nut sleeve 47. The latter can be displaced over a lever system 48, which is under spring effect, by traveling nut 31. Connection between gear members and the members for indicating picture counting and measurement of the tension condition of the driving spring is thereby formed in such manner that at one edge 49 of the unblackened portion of the glass disc, always the number of the next film section to be exposed can be read, while edge 50 of sector disc 44 adjusts itself in such manner that numbers of subsequent pictures, for which the tension of the driving spring is still sufficient, can be read between sector disc 44 and edge 49. For example, in the embodiment illustrated in Figure 2, the indicating members are in a position which indicates that the next picture will be number "4," and the energy of the driving spring in this particular condition is sufficient for taking pictures "4," "5," "6" and "7." Upon release of the exposure of picture number "4," the counting disc will turn by one number to the left, and the same happens to sector disc 44, relative to glass disc 43. Therefore, complete closing of the reading window formed by rim 49 and edge 50 of sector disc 44, means that the elastic force of the spring mechanism is insufficient for any additional picture taking, i.e. that prior to further use of the camera the spring mechanism must be rewound.

The embodiment illustrated in Figure 1 involves also a limitation of movement, which prevents overwinding of the driving spring. In order to obtain this limitation traveling nut 31 bears with its lower front surface against bearing 51 of the camera wall, when the desired maximum tension of the driving spring is attained and thus prevents further winding of the spring.

Figures 3 and 4 illustrate a winding member for the spring mechanism of a photographic camera. After winding up said spring mechanism, said member can be turned down against an elastic force acting thereon, and automatically swings into the winding position shown, when a certain amount of the spring tension is released. Bar 52 is capable of swinging about head 53 of winding shaft 54. A torsion spring 55 acting between these two parts, serves for moving member 52 to the position shown, in which it bears against a stop not shown in the drawing. Furthermore, rod 56, which is centrally and non-rotatably, but displaceably arranged in winding shaft 54, is in engagement with a traveling nut, or the like, which moves in dependence on the tension of the driving spring. On the upper end of rod 56, two spoke-like, elastic rods 57 are fastened. As these rods are guided by two-fork-like members 58, which are likewise fastened to bar 56, they are elastically movable in axial direction only. Member 52 has two bores 59, which are equiaxial relative to its swinging axis, and rods 57 bear against cylindrical surfaces of said bores in the swung out position of member 52. If member 52 is turned from the position shown in the drawing, by 90°, the elastic rods will enter detent grooves 60, so that member 52 is locked in said turned position. Thereby, the position in the drawing of rod 56, corresponds to the position of the traveling nut (not shown) when the spring mechanism is not run down yet. When the critical minimum tension of the spring mechanism is reached, rod 56 will move in the direction of arrow 61, so that elastic rods 57 leave grooves 60. Thereby torsion spring 55 causes member 52 to move until it reaches the winding position shown and bears against a stop (not shown).

It will be understood that this invention is not limited to the specific constructions, designs and other details specifically described and illustrated in the drawings and can be carried out with various modifications without departing from the scope of the invention, as defined in the appended claims.

The term "photographic cameras provided with a spring mechanism" or the like, is used in the present application to denote the well-known type of cameras in which a spring mechanism causes automatic operation of certain parts of the camera, for example operation of shutter tensioning, film winding, picture-counting etc. Such cameras are described for example in U.S. Patents Nos. 2,160,818 and 2,608,921.

What is claimed is:

1. A photographic camera provided with a release button and a spring mechanism including a driving spring, for carrying out steps in order to bring about camera functions necessary for taking a plurality of photographic pictures, comprising first means for feeling and indicating the tension condition of the driving spring and second means which lock the camera function and prevent said release button from being pressed down when the tension of the driving spring falls below a predetermined minimum tension; said first means, as well as said second means, being controlled by a common control member; said spring mechanism having a winding shaft arranged in the camera casing and secured from turning in one direction by a locking means, and comprising said common control member consisting of a non-rotatably, but axially displaceably guided traveling screw-nut which engages the winding shaft; the position of said traveling screw-nut being dependent on the tension condition of the driving spring; said second means including an angle lever arranged in the camera casing and provided at the end of one of its arms with a nose adapted to lockingly engage a groove provided in the release button; said traveling nut being adapted to engage the end of the other arm of said lever, in order to cause said end of one of the lever arms to engage said groove provided in the release button when the tension of the driving spring falls below a predetermined minimum tension, said traveling nut being adapted to engage a feeling element of said first means.

2. A photographic camera as claimed in claim 1, in which said one arm of the angle lever is elastically formed in order to render its nose capable of being displaced by an amount which is at least equal to the depth of said groove provided in the release button.

3. A photographic camera as claimed in claim 2, which comprises combined means for picture-counting and indicating the tension of the driving spring and in which displacements of the traveling nut are transmitted over a lever system and a non-rotatable nut sleeve connected therewith and provided with a steep interior thread, said nut sleeve being adapted to rotatably receive a shaft carrying a sector disc forming part of said combined means for picture-counting and indicating the tension of the driving spring.

4. A photographic camera as claimed in claim 3, in which the combined means for picture-counting and indicating the tension of the driving spring include a picture-counting disc and a film counting wheel having feeling means acting on a coacting means which is connected with the picture-counting disc; a reading window for the counting disc, said window having a first edge which is stationary relative to the camera and at which information on the number of the next picture to be taken can be observed, said window having a second edge which forms part of said sector disc, is displaceable and is controlled by said first means so that the number of exposures which can be made in the respective tension condition of the driving spring are exhibited in the window between said edges.

5. A photographic camera as claimed in claim 4, in which the counting disc is rotatably arranged under a partially blackened glass plate including said stationary edge and allowing observation of not more than half of the counting disc.

6. A photographic camera as claimed in claim 5, in which said sector disc is rotatably arranged between the glass plate and the counting disc, equiaxially with the latter, for rendering a portion not exceeding half of the counting disc, accessible to observation.

References Cited in the file of this patent

UNITED STATES PATENTS

| | | |
|---|---|---|
| 1,280,305 | Roig | Oct. 1, 1918 |
| 1,473,930 | Freedman | Nov. 13, 1923 |
| 1,588,666 | Donchian | June 15, 1926 |
| 1,683,314 | Stinchfield | Sept. 4, 1928 |
| 2,214,184 | Sperry | Sept. 10, 1940 |

FOREIGN PATENTS

| | | |
|---|---|---|
| 720,133 | Germany | Apr. 27, 1942 |